Jan. 27, 1931.   G. C. BAKEWELL   1,790,257

MIXING, DISSOLVING, OR DISPERSING APPARATUS

Filed March 20, 1929

INVENTOR
Gifford C. Bakewell
BY
Frank ———
ATTORNEY

Patented Jan. 27, 1931

1,790,257

UNITED STATES PATENT OFFICE

GIFFORD C. BAKEWELL, OF NEW YORK, N. Y., ASSIGNOR TO THE TURBO-MIXER CORPORATION, OF NEW YORK, N. Y., A CORPORATION OF NEW YORK

MIXING, DISSOLVING, OR DISPERSING APPARATUS

Application filed March 20, 1929. Serial No. 348,434.

My invention relates to apparatus of the class generally called "mixing" apparatus, but which is especially adapted for the rapid, thorough and efficient reduction or mixing of solids in liquids, and dissolving, dispersal, or exceptionally thorough and uniform distribution of colloidal or other particles through the liquid, and analogous uses.

To these ends the invention consists, as broadly described, (in cooperation with a tank and a mixer of known or suitable type therein) in series of stationary blades, teeth or baffles, which may have sharp or angularly-directed points or edges, adjacent or surrounding the mixer, and which act on solids circulated along with the liquid to first break up, or reduce the solids, if they are in large lumps and masses, to smaller sizes or particles, down to colloidal dimensions when desired, and to thoroughly and uniformly disperse (distribute) such particles throughout the liquid.

The apparatus also acts efficiently on various mixtures or solutions of viscous character, to break up or separate the viscous or "stringy" ingredients and effect thorough dispersal thereof throughout the "mix."

Other uses or modes of operation, and utility for mixing, dissolving, or dispersing various materials or mixtures, will be understood by skilled persons.

The characteristics and advantages of the invention are further sufficiently explained in connection with the following detail description of the accompanying drawing, which shows certain exemplifying embodiments. After considering these examples, skilled persons will understand that many variations may be made, and I contemplate the employment of any structures that are properly within the scope of the appended claims.

Figure 1:
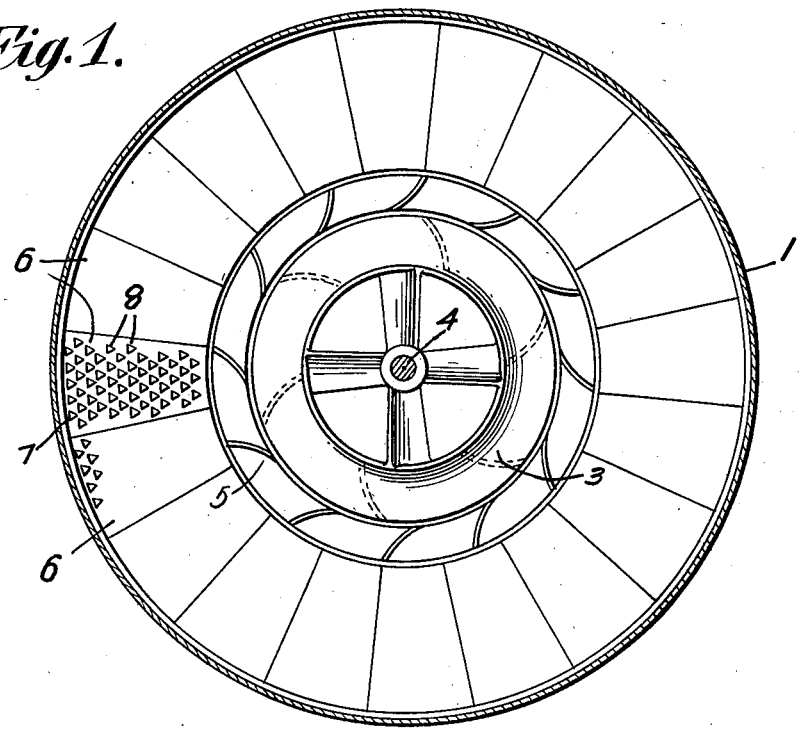
Fig. 1 is a top plan of apparatus embodying the invention in one form.

Tank 1 may be of any suitable type or form. As shown it has a rounded, or part-spherical bottom 2. Centrally in the tank, adjacent or at the bottom is a mixer of any known or suitable type. The function of this mixer is to impel the liquid containing solids to be mixed, or the viscous mixture or solution, providing the necessary circulation of the materials, and at the same time intermixing the ingredients so far as such mixing or impelling apparatus has capacity to do so. As shown the mixer is of a known type, called a "turbo-mixer," and includes a bladed rotor or impeller 3 mounted on and driven by a shaft 4, and a stationary, bladed deflector 5 surrounding the impeller.

Around the deflector I provide a multiplicity of stationary teeth, blades, or baffles, to act upon the circulated material in ways sufficiently explained above and hereafter. While the blades, teeth, or analogous devices may be formed or provided in various ways, as by forming them in the integral material of the tank bottom. In the present specific embodiment (Figs. 1 and 2) plates 6 have blades 7 produced in them by punching and bending operations. The plates are shaped to conform to the tank by riveting, spot-welding, etc. Each plate is one segment or section of an annular series surrounding the deflector, as easily understood in Fig. 1. This structure or arrangement represents one easy and economical mode of installing the blades or baffles in the desired position.

Figure 2:
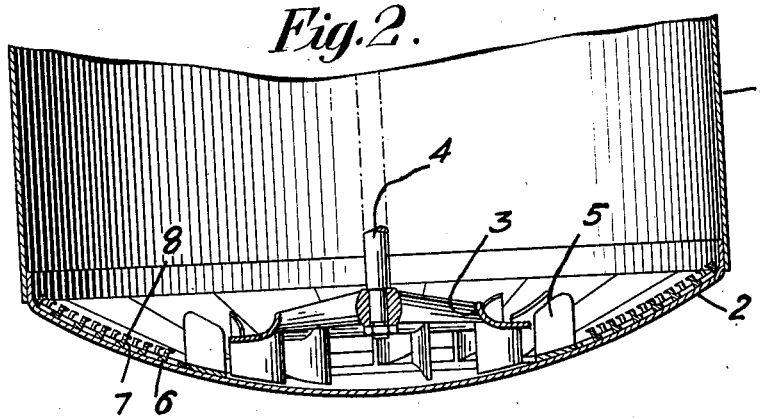
Fig. 2 is a vertical section of the lower part of a tank including the invention structure.

The blades desirably project upward, substantially perpendicularly to the plates and tank bottom, and in this instance have their broad faces at right angles to the material flow, which is in radial directions. The blades are in series of rows, and preferably the blades in adjacent rows are in staggered relation (Fig. 1). Desirably also, the blades, or some of them, have end portions 8 bent over at a right angle to the main plane of the blade, and directed inward, or "against" the flow of material, and preferably, also, these ends are pointed, as also shown in Fig. 1.

Material circulated by the impeller is discharged from the deflector blades in generally radial directions, a part of it passing near the tank bottom, and such material is intercepted by the blades or baffles 7 and caused to pursue a tortuous course through the baffle rows. The hooked ends or teeth 8 also act upon the material, and the blades and teeth attenuate and disrupt viscous or stringy components. Solids, if present at first in large lumps or masses, encounter the blades and teeth and are quickly worn, cut, or broken down into small particles, or to colloidal dimensions, and these particles or colloids are thoroughly and uniformly dispersed through the liquid or viscous body, in much shorter time, and more effectively, than has been possible with previous mechanisms. The blades or baffles also act to free solid masses or particles from gelatinous coatings (as in an acid dissolving or reducing process) and thus expedite the reduction or dissolving of the solids.

Figure 4:
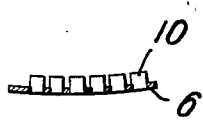
Fig. 4 is a section at 4—4, Fig. 3.
Figure 3:
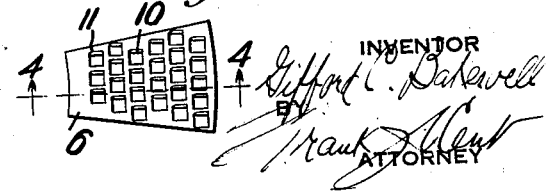
Fig. 3 is a plan view of a modified baffle-plate.

Figs. 3 and 4 show one modification, in which blades 10 are arranged in generally radial, vertical planes, or "edgewise" to the material flow, and preferably their leading (inward) edges 11 are sharpened, as in Fig. 3. These blades with their knife edges have more efficient action on solids, or other materials, in some cases.

I claim:

1. Apparatus of the class described, comprising, in combination with a tank and circulating means therein, a multiplicity of baffle blades adjacent and about said means and arranged to cause circulated material to travel in a tortuous course and expedite dissolving, reduction of solids and dispersal of solid particles throughout the material, the baffle blades being arranged on segmental plates which are assembled to form an annular series about the circulating means.

2. Apparatus of the class described, comprising, in combination with a tank and a mixer therein, a multiplicity of baffle blades adjacent and about the mixer and arranged to cause circulated material to travel in a tortuous course and expedite dissolving, reduction of solids and dispersal of solid particles throughout the material, the blades having angularly directed teeth.

3. Apparatus of the class described, comprising, in combination with a tank and a mixer therein, a multiplicity of baffle blades adjacent and about the mixer and arranged to cause circulated material to travel in a tortuous course and expedite dissolving, reduction of solids and dispersal of solid particles throughout the material, the baffle blades being arranged edgewise to material flow and having sharp leading edges.

4. Apparatus of the class described, comprising, in combination with a tank and a mixer therein, a multiplicity of baffle blades adjacent and about the mixer and arranged to cause circulated material to travel in a tortuous course and expedite dissolving, reduction of solids and dispersal of solid particles throughout the material, the baffle blades being arranged on segmental plates which are assembled to form an annular series about the mixer.

5. Mixing and shredding or tearing apparatus comprising a tank, a rotary mixer and circulator adjacent the tank bottom including an impeller and a deflector about the impeller, and circular rows, each row including a multiplicity of shredding or tearing teeth substantially at the tank bottom about the deflector, the teeth being arranged to act on circulated material and tear, shred or disrupt solid components thereof and expedite mixing.

6. Mixing and shredding or tearing apparatus of the class set forth comprising a tank, and therein a rotary bladed mixer which receives material centrally and discharges it rapidly in a substantially horizontal or cross axial plane, and shredding or attritive means surrounding the mixer, said means consisting of a multiplicity of teeth located substantially in the plane of flow of the material from the mixer and serving to tear, shred or disrupt solid components of the mixture and expedite mixing.

7. Mixing and shredding or comminuting apparatus for material of a generally liquid character including solids, semi-solids, viscous or fibrous materials, said apparatus comprising a tank and therein a rotary turbo-impeller and a stationary deflector surrounding the impeller, the material being discharged from the deflector in generally radial directions and substantially in a cross axial plane of the impeller, and a multiplicity of relatively small tearing or comminuting blades arranged to occupy an annular space of substantial area about the deflector and substantially in the plane of material flow therefrom, said blades acting repeatedly on relatively solid components of the material to tear, disrupt or comminute the same and expedite mixing.

In testimony whereof I affix my signature.

GIFFORD C. BAKEWELL.